Figure 1:
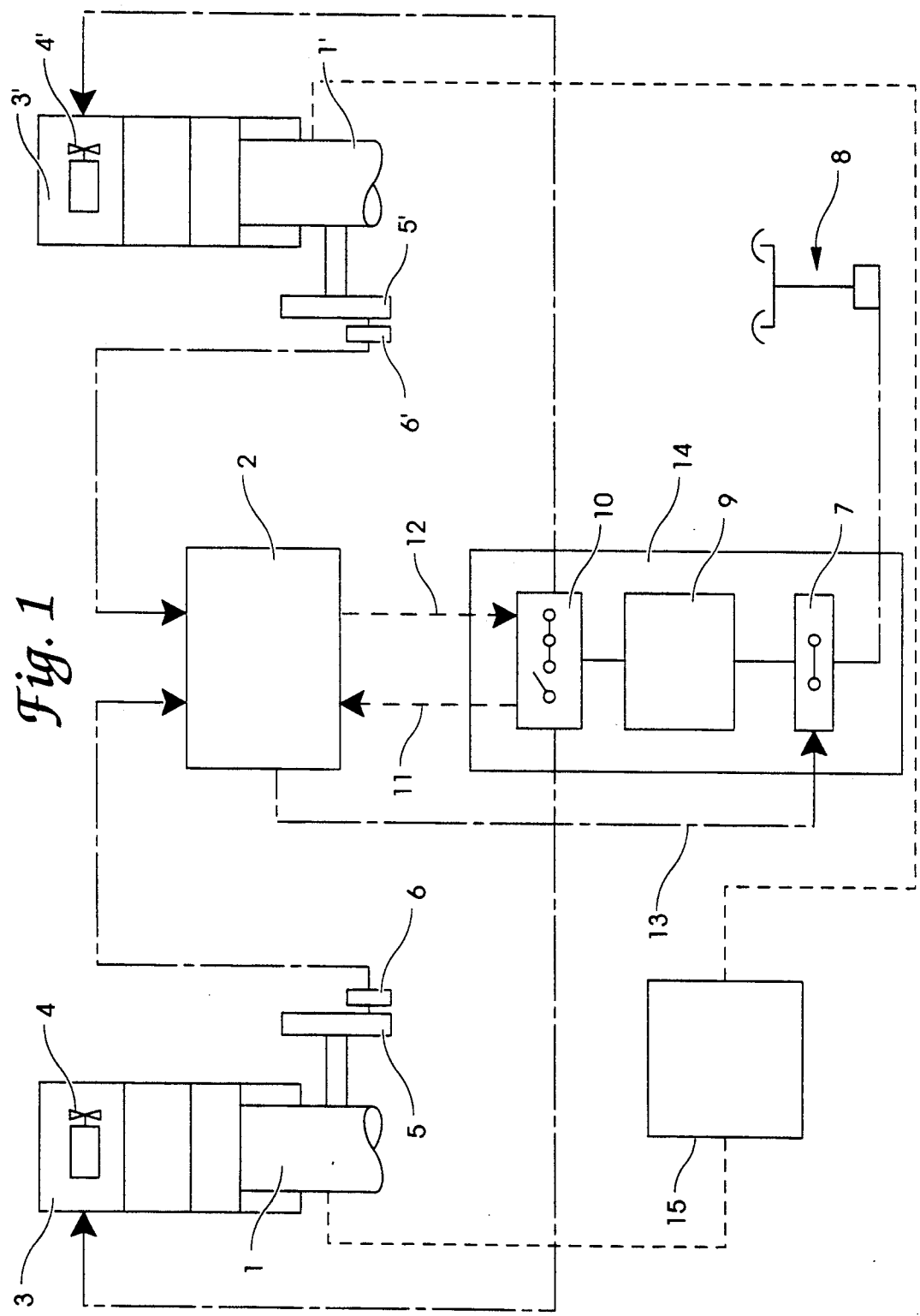

United States Patent [19]

Gallandere

[11] Patent Number: 5,303,641
[45] Date of Patent: Apr. 19, 1994

[54] METHOD FOR CHECKING THE DRIVING AND CONTROL SYSTEM OF HYDRAULIC PUNCH BRAKES

[76] Inventor: Jean-Pierre Gallandere, 1164 Buchillon, Switzerland

[21] Appl. No.: 965,056

[22] Filed: Oct. 22, 1992

Related U.S. Application Data

[63] Continuation of Ser. No. 616,409, Nov. 21, 1990, abandoned.

[30] Foreign Application Priority Data

Nov. 22, 1989 [CH] Switzerland ............. 04193/89

[51] Int. Cl.⁵ .................. B30B 13/00; B30B 15/18
[52] U.S. Cl. ........................... 100/35; 100/43; 100/48; 100/99; 100/269 R; 92/5 R; 91/361
[58] Field of Search ............ 100/35, 43, 48, 53, 100/99, 269 R; 83/58, 62, 62.1, 72; 72/26, 21; 91/361, 363 R, 363 A, 1, 447; 60/403; 340/686, 626, 679, 452, 453; 92/5 R; 371/14; 187/73

[56] References Cited

U.S. PATENT DOCUMENTS

| | | | |
|---|---|---|---|
| 3,161,044 | 12/1964 | Harrison et al. | 100/99 |
| 3,802,318 | 4/1974 | Sibbald | 91/363 R |
| 3,986,437 | 10/1976 | Lioux | 92/5 R |
| 4,048,886 | 9/1977 | Zettler | 72/26 |
| 4,148,203 | 4/1979 | Farazandeh et al. | 100/48 |
| 4,161,649 | 7/1979 | Klos et al. | 235/92 MP |
| 4,205,603 | 6/1980 | Baker, Jr. | 100/53 |
| 4,210,228 | 7/1980 | Vaarala | 92/5 R |
| 4,408,471 | 10/1983 | Gossard et al. | 72/21 |
| 4,429,627 | 2/1984 | Edsö | 100/43 |
| 4,458,514 | 7/1984 | Bathory | 100/99 |
| 4,524,582 | 6/1985 | Lucas et al. | 100/48 |
| 4,676,421 | 6/1987 | Swanstrom | 227/8 |
| 4,793,241 | 12/1988 | Mano et al. | 92/5 R |
| 4,819,467 | 4/1989 | Graf et al. | 72/21 |
| 5,024,250 | 6/1991 | Nakamura | 91/1 |

FOREIGN PATENT DOCUMENTS

| | | | |
|---|---|---|---|
| 0318366 | 5/1989 | European Pat. Off. | |
| 3638149 | 3/1987 | Fed. Rep. of Germany | 100/99 |
| 0142800 | 9/1982 | Japan | 100/99 |
| 61999 | 4/1983 | Japan | |
| 0795968 | 1/1981 | U.S.S.R. | 100/43 |

*Primary Examiner*—Harvey C. Hornsby
*Assistant Examiner*—Tony G. Soohoo
*Attorney, Agent, or Firm*—Woodard, Emhardt, Naughton, Moriarty & McNett

[57] ABSTRACT

A method for checking the driving and control system of a hydraulic punch press is provided which comprises the steps of delivering a stop order signal to the driving device, sensing the position of the sliding punch member along its stroke and comparing the time or the distance required by the punch member to come practically to a stop, with preset reference values, and producing a fault signal when the time or distance exceeds the preset reference values.

1 Claim, 1 Drawing Sheet

METHOD FOR CHECKING THE DRIVING AND CONTROL SYSTEM OF HYDRAULIC PUNCH BRAKES

This application is a continuation of application Ser. No. 07/616,409, filed Nov. 21, 1990, now abandoned.

The present invention relates to the checking of the driving and control system of punch brakes or punch presses, and similar machinery and, more particularly, to the checking of press brakes having a hydraulic driving system and a control system comprising programmable electronic control means.

In the use of power press brakes, devices and methods have been employed to ensure the safety of the operator by providing automatic braking of a reciprocating punch member when, for example, a hand of the operator comes within the zone between the moving punch member and the workpiece. It has also been proposed to monitor the braking action by initiating a braking sequence at a preset angle of the machine cycle and determining the braking time or the braking degrees of the machine. Such monitoring systems were proposed for machines driven by a rotatory shaft and position sensing means were coupled to that shaft to provide a readout of the shaft angle values.

Such a sensing arrangement is not appropriate for hydraulic driving systems in which a sliding punch member is actuated by one or two hydraulic cylinders, since it only provides indirect monitoring of the punch member and does not allow the checking of certain major operating characteristics of hydraulic press brakes, as explained hereafter.

It is, therefore, a primary object of the present invention to provide a method for checking the driving and control system of hydraulic press brakes based on a direct sensing of the movement of the punch member.

A further object of the invention is to provide a checking method for the state of the hydraulic driving device and, more particularly, of each hydraulic driving device used in the machine, more specifically for detecting a possible leakage in such a device.

Another object of the invention is to provide a checking method allowing to detect a default of symmetry of two driving devices arranged on either side of the punch member, resulting for example from excessive leakage or from another defect in one of these devices.

In accordance with the invention, a method for checking the driving and control system of a hydraulic press brake is provided which comprises the steps of delivering a stop order signal to the driving device, sensing the position of the sliding punch member along its stroke and comparing the time or the distance required by the punch member to come practically to a stop, with preset reference values, and producing a fault signal when said time or distance exceeds said preset reference values.

The method of the invention preferably comprises the step of determining a further movement of the punch member after the same has been brought to an intermediate stop, so as to detect a possible substantial leakage of the hydraulic driving device.

The method of the invention preferably applies to a punch press having two hydraulic driving devices, one at each side of the punch member, and comprises the steps of sensing the position of the punch member, independently on each side thereof, and producing a fault signal when the times or the distances required by the punch member to come practically to a stop, on either of the sides exceed preset reference values.

A more complete understanding of the invention may be obtained from the following description of an embodiment thereof, illustrated in the accompanying drawing in which:

FIG. 1 is a block diagram showing, by way of example, the arrangement of the driving and control system of a hydraulic press brake for use with the method according to the invention.

In the diagram of FIG. 1, two hydraulic cylinders 1 and 1' are schematically shown to drive a slide 15, on either side thereof, in a reciprocating motion. Slide 15 represents the punch member of a hydraulic press having two independent driving devices operated under the control of control means 2, 14. These driving devices have each a respective hydraulic control block 3, 3' including one or more valves 4, 4', the operation of which is controlled by a numerical control device 2. The pistons of the hydraulic cylinders 1, 1' are each carrying a linear measuring scale 5, 5', disposed so as to move vertically opposite a corresponding stationary measuring head 6 or 6'. Each measuring head is electrically connected to the control device 2 and delivers a position signal providing precise information as to the relative movement of each measuring scale with respect to the associated head. In practice, 5, 6 and 5', 6' can be formed by usual linear optical encoding devices.

The position signals are processed in the numerical control device 2, as indicated hereafter. The control means of the press brakes further comprise a stop checking relay 7 connected to the numerical control device 2 and to a manual control station 8, such as a usual two-hand control switch device to be actuated by the operator. A checking device 9 for the manual control station 8 and a control relay 10 connected to the numerical control device 2 are further provided as parts of the control means located in a control box 14. The control relay 10 is further connected to the hydraulic blocs 3 and 3' for controlling the operation of the valves 4, 4' thereof.

In the operation of the press brake, when the operator's manual control station 8 delivers an order to start a down-stroke motion of the punch slide 15, a corresponding signal is transmitted through the control relay 10 to the numerical control device 2, as illustrated by the dashed line 11. The control device 2 delivers an authorization signal back to the control relay 10, as illustrated by the dashed line 12. The control relay thereupon actuates the valves 4 and 4' to operate the down-stroke of the slide 15.

When starting a checking operation before the actual working operation of the press brake, the control means are initialized, so that the encoders 5, 6 and 5', 6' provide an absolute position information. The checking of the braking capability of the press is effected by producing a stop order signal when the slide has moved over a programmed distance and has reached a corresponding speed. The stop order signal is delivered from the numerical control device 2 over a connection line 13 to relay 7 to disable the manual control station 8 and to operate the valves 4, 4' through relay 10, so as to bring the slide to a stop. The numerical control device 2 processes the position information signals received from the measuring heads 6, 6' to determine and compare with preset reference values, the braking distance and braking time for each of the driving devices 1, 1'.

When one of the reference values is exceeded, a corresponding default signal is generated which can result, for example, in an accoustical alarm signal, an optical display and/or a blocking signal for preventing the working operation of the press.

The checking of the operation of the driving device comprises the detection of a possible abnormal leakage in the hydraulic systems of the press. This is effected by monitoring a possible movement of the slide after the same has practically come to a stop in an intermediate position, such as the position reached after the checking of the braking operation described above. Distance and time reference values for this movement of the slide from its stop position, or a position in which the slide has a very small residual speed due to normal leakage, are preset in the control device 2 and compared with the corresponding sensed values. If such preset values are exceeded, respective default signals are generated to indicate excessive leakage in the driving devices on either side of the slide.

It is to be noted that the checking method according to the invention allows to obtain selective information as to the proper operation of the entire control and driving system of the press and, accordingly, allows to trace defects in the mechanical, electrical, electronic and hydraulic devices which are part of the control and driving chain.

I claim:

1. A method for checking the driving and control system of a hydraulic press brake having a sliding punch member actuated in a reciprocating motion by two hydraulic driving devices, each comprising at least one hydraulic cylinder, which driving devices are arranged on either side of said punch member and are operated under the control of a common control device, said press brake having means for sensing the position and the speed of said punch member independently on either side thereof, said method comprising the successive steps of delivering a stop order signal to the driving devices, sensing the stop position of said punch member by said means for sensing the position independently on either side thereof and comparing with preset reference values the time or the distance required by the punch member to come practically to a stop, and producing a fault signal when said times or distances on either of the sides of the punch member exceed said preset reference values, and monitoring for a possible further movement of said punch member after it has come to a stop, and comparing the further movements on both sides of said punch member by said means for sensing the position and the speed independently on either side of said punch member, any difference between the further movements on both sides of said punch member being indicative of an asymmetric leakage condition of said hydraulic driving devices.

* * * * *